United States Patent
Stuivenwold

(10) Patent No.: US 8,463,333 B2
(45) Date of Patent: Jun. 11, 2013

(54) MOBILE PHONE WITH LOW-POWER MEDIA RENDERING SUB-SYSTEM

(75) Inventor: Armand Stuivenwold, Wijchen (NL)

(73) Assignee: ST-Ericsson SA, Plan-les-Ouates (CH)

(*) Notice: Subject to any disclaimer, the term of this patent is extended or adjusted under 35 U.S.C. 154(b) by 101 days.

(21) Appl. No.: 12/936,580

(22) PCT Filed: Apr. 6, 2009

(86) PCT No.: PCT/EP2009/054094
§ 371 (c)(1),
(2), (4) Date: Jan. 27, 2011

(87) PCT Pub. No.: WO2009/124911
PCT Pub. Date: Oct. 15, 2009

(65) Prior Publication Data
US 2011/0124375 A1 May 26, 2011

(30) Foreign Application Priority Data
Apr. 7, 2008 (EP) .................................. 08103414

(51) Int. Cl.
*H04M 1/00* (2006.01)
*H04B 1/38* (2006.01)

(52) U.S. Cl.
USPC ...... 455/574; 455/90.1; 455/90.2; 455/343.2; 455/343.5; 455/414.1; 455/418; 455/550.1; 455/556.2; 370/310.2; 370/328; 713/300; 713/310; 713/320; 713/321; 713/323; 711/100; 711/111; 711/112; 700/94

(58) Field of Classification Search
USPC ............. 455/414.1, 418, 550.1, 556.1, 556.2, 455/574, 343.2–343.5, 90.1, 0.2; 370/310.2, 370/328; 700/94; 711/100, 111, 112; 713/300, 713/310, 320, 321, 323

See application file for complete search history.

(56) References Cited

U.S. PATENT DOCUMENTS

| 7,496,770 | B2 | 2/2009 | Gupta | |
| 2002/0087225 | A1* | 7/2002 | Howard | .......................... 700/94 |
| 2007/0094444 | A1 | 4/2007 | Sutardja | |

FOREIGN PATENT DOCUMENTS

EP 1 221 645 A 7/2002

OTHER PUBLICATIONS

PCT: Written Opinion of the International Searching Authority of PCT/EP2009/054094; Jul. 2, 2009; 7 pages.
PCT: International Search Report of PCT/EP2009/054094; Jul. 2, 2009; 3 pages.

* cited by examiner

*Primary Examiner* — Steve D Agosta
(74) *Attorney, Agent, or Firm* — Howison & Arnott, L.L.P.

(57) ABSTRACT

A mobile telephone has a rendering functionality for rendering media stored in storage, and a user interface for user control. A host processor controls the communication functionality and the user interface. The co-processor controls the rendering of the media. The host processor has high power consumption in an active mode and low power consumption in a sleep mode. The co-processor conditionally supplies wake-up signals to the host processor. Upon receipt of a particular wake-up signal, the host processor switches from the sleep mode into the active mode. In the active mode, the host processor transfers a particular media segment to the co-processor before switching back to the sleep mode. The co-processor buffers the segment before rendering it. Upon detecting a low buffer level the co-processor supplies a next wake-up signal to the host processor for initiating transfer of a next media segment.

7 Claims, 4 Drawing Sheets

MOBILE PHONE WITH LOW-POWER MEDIA RENDERING SUB-SYSTEM

CROSS-REFERENCE TO RELATED APPLICATIONS

The present application is a U.S. National Phase application submitted under 35 U.S.C. §371 of Patent Cooperation Treaty Application Serial No. PCT/EP/2009/054094, filed Apr. 6, 2009, entitled MOBILE PHONE WITH LOW-POWER MEDIA RENDERING SUB-SYSTEM, which application claims priority to European Application Serial No. EP 08103414.2h, filed Apr. 7, 2008, entitled MOBILE PHONE WITH LOW-POWER MEDIA RENDERING SUB-SYSTEM, the specifications of which are incorporated herein by reference in their entireties.

TECHNICAL FIELD

The invention relates to a mobile electronic device, e.g., a mobile telephone or a mobile computing device with a communication network interface. The device has a communication functionality for communicating via an external network, and a media rendering functionality for rendering content information stored in a storage.

BACKGROUND

A mobile telephone has a baseband engine dedicated to implementing the telephony function. In today's mobile phones, the baseband engine (also referred to as "application engine" provides many functions in addition to the conventional telephony application. Additional functions relate to, e.g., user-interface control, rendering of media such as audio and video in the user interface, location-based services, network connectivity and browsing. Small form-factor and autonomy are key issues to mobile phone users. As a result, the base-band engine is a highly integrated system-on-chip (SoC) with a minimum of periphery and with means for implementing a stand-by mode with very-low power consumption. Presently, the base-band engine consumes very low power during times that the cellular front-end is updating with the network for any incoming call. Most of the engine's circuitry is switched off and only little circuitry is powered for sensing a trigger at the RF front-end.

However, the means for implementing the stand-by mode are tailored to the scenario, wherein the mobile phone is waiting for an incoming call and wherein significant data traffic is not required. As soon as the user interacts with the phone (e.g., the user requests interactivity or needs a service), the base-band engine consumes power at a significantly higher level, even while the engine is idling, as its data traffic backbone is designed for high-speed and for concurrent media processing functions. As a result, certain mobile phones equipped with many features cannot be used adequately, because the phone's power pack or battery is being depleted of stored charge within an inconveniently short time period (e.g., a day, or even a couple of hours). This is particularly relevant to the playback of media, such as MP3 data, particularly audio. Users would like to see an increase in playing time. Currently, a playing time of approximately 20 hours is achieved before the battery is to be recharged, and this amount of time is considered too low.

Looking at it from another perspective, a trend has emerged in the field of mobile telephony in the form of newer mobile phones being provided with ever-extending functionality. Various digital technologies are converging on the mobile phone. For example, mobile phones are being equipped with circuitry for applications such as GPS navigation, mobile TV, mobile email, etc. As another example, fixed and mobile telephony are converging in the sense that the modern mobile handsets support both communication via the wide-area cellular access network and communication via a local wireless connection to the Internet (e.g., for voice over IP (VoIP)). The latter trend is being referred to as "fixed-mobile convergence". The mobile phone platforms resulting from these converging technologies are sometimes referred to as "converging architectures". Previously, the circuitry implementing the single communication functionality was optimized with regard to, among other things, low power-consumption. Merging various functionalities within the same platform and sharing hardware components among different functionalities renders moot the previous optimizing with respect to low power-consumption.

SUMMARY

Some embodiments of the present invention enable longer playtimes of media on a mobile phone or similar mobile electronic device with onboard wireless telephony or another onboard data communication functionality. The longer playtime does not hamper the essential functionality of the mobile phone or of the other mobile electronic device. Such essential functionality includes the use of the device as a phone and appropriate and fast user interface functionality.

The inventor therefore proposes an exemplary mobile electronic device with a communication functionality for communicating via an external network, a rendering functionality for rendering content information stored in a storage, and a user interface for user control of the device. The device comprises a host processor for control of the communication functionality and of the user interface; and a co-processor for control of the rendering functionality. The host processor has access to the storage. The host processor has an active mode and a sleep mode. The host processor has high power consumption in the active mode and low power consumption in the sleep mode. The co-processor is configured to conditionally supply wake-up signals to the host processor. The host processor is configured for, upon receipt of a particular one of the wake-up signals, switching from the sleep mode into the active mode. The host processor is configured for, in the active mode, transferring a particular one of multiple segments of the content information to the co-processor before switching back to the sleep mode. The co-processor is configured for buffering the particular segment in a buffer before rendering the particular segment. The co-processor is configured for, upon detecting a predetermined level regarding a progress of the rendering of the particular segment, supplying a next one of the wake-up signals to the host processor for initiating transfer of a next one of the multiple segments from the storage to the co-processor under control of the host processor.

The host processor is still the master of the system onboard the device. The host processor controls the device's user interface. As the rendering process is linear in time, the content information can be divided into temporally consecutive segments, and the rendering of consecutive ones of the segments can be concatenated. The segmentation of the content information and the play out at the co-processor enables the host processor to operate in burst and to stay in a sleep mode between bursts. The host processor can stay optimized for the communication functionality, and the co-processor, together with the other components in the circuitry implementing the rendering functionality, can be optimized for the media rendering. As a result, power consumption can be minimized or optimized for media-specific rendering tasks.

In an embodiment of the device in the invention, the co-processor comprises a combiner for combining in a rendering component the rendering of the content information with rendering of a communication received via the external communication network. Accordingly, the rendering of the communication can be mixed with the rendering of the content information that is being played out during the incoming communication.

In a further embodiment of the device in the invention, the device is configured for enabling or disabling the rendering component under control of the host processor for control of rendering of the communication when the co-processor is in a sleep mode. If the co-processor is inactive, the host processor directly controls the rendering component for rendering the communication, using minimum resources at the co-processor.

In a further implementation, the co-processor integrated circuit comprises a volatile memory unit. This requires reloading of operation instructions from the host processor each time the co-processor undergoes wake up by the host processor. However, it allows overall reduction of power consumption. It turns out that this reloading of operation instructions is—at least currently—most suitably if the processed media is audio data. With audio data, the amount of operation instructions and media data is appropriate in view of the needed data transfer.

Most suitably for further power reduction, the co-processor comprises a separate power management unit. Such power management unit may be embedded in the co-processor integrated circuit, or can be provided as a separate chip.

In another aspect, the invention relates to a method of operation of the said device. Basically, the method comprises the steps of:
 switching the host processor from a sleep mode into an active mode upon receipt of a wake-up signal;
 transferring a particular one of multiple segments of the content information by the host processor from the storage to the co-processor;
 switching the host processor back into the sleep mode;
 buffering the particular segment of the content information in a buffer of the co-processor and thereafter rendering the particular segment;
 upon detecting a predetermined level regarding progress of the rendering of the particular segment, supplying a next one of the wake-up signals from the co-processor to the host processor for initiating transfer of a next one of the multiple segments from the storage to the co-processor under control of the host processor.

In a first embodiment, the—first—wake up signal is a signal from the co-processor. However, it is not excluded that the first wake up signal is generated through the user interface or through the communication facility.

It is to be understood, in the context of this application, that the host processor need not to be completely in sleep mode upon switching to the active mode. It could be, for instance, that the portion dedicated to the rendering functionality is in sleep mode, whereas other portions such as those related to the control of the communication functionality are active. Moreover, a wake-up signal to switch to an active mode also includes the option of a signal to switch a host processor to the active mode for enabling the rendering of the content information.

In a further embodiment, upon receipt of an instruction to start rendering the content information, the host processor initiates the co-processor. This may include the supply of a specific wake-up signal to the co-processor from the host processor. More preferably, the initialization comprises a step of transferring operation instructions by the host processor to the co-processor. This is particularly desired in case that the co-processor operates on the basis of an internal volatile memory.

In a further aspect, the invention relates to the co-processor for use in the mobile electronic device of the invention. The co-processor thereto comprises:
 means for conditionally supplying wake-up signals to a host processor in the mobile electronic device;
 means for receiving at least one segment of content information from the host processor
 a buffer for buffering the particular segment
 processing means for rendering the segment
 detecting means for detecting a predetermined level regarding a progress of the rendering of the particular segment so as to enable supply of a next wake-up signal to the host processor.

The co-processor may include one or more integrated circuits.

BRIEF DESCRIPTION OF THE DRAWINGS

The invention is explained in further detail, by way of example and with reference to the accompanying drawings, wherein.

Throughout the Figures, similar or corresponding features are indicated by same reference numerals.

DETAILED DESCRIPTION

Figure 1:
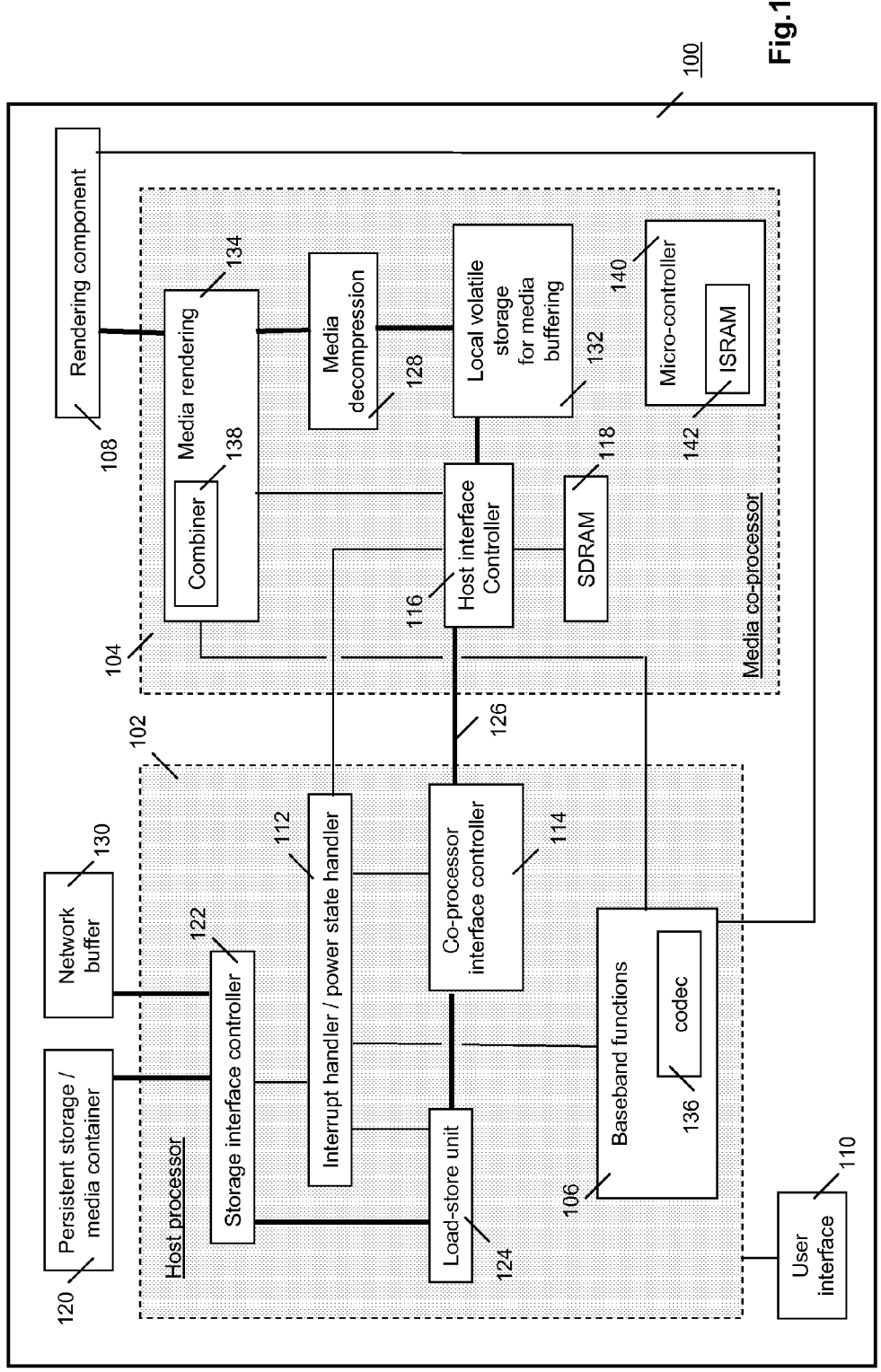
FIG. 1 is a block diagram of an electronic wireless communication device in the invention.

FIG. 1 is a block diagram of an electronic wireless communication device 100 in the invention. Device 100 accommodates a host processor 102 and a media co-processor 104. Host 102 controls, among other things, baseband functionalities of module 106 of device 100. Co-processor 104 controls the rendering of media (also referred to herein as: "content information") e.g., stored or downloaded audio or video, in a suitable rendering component 108 (e.g., a display monitor, a loudspeaker). The user of device 100 interacts with device 100 via a user interface (UI) 110. In an embodiment of device 100, UI 110 is implemented as, e.g., a collection of hard-buttons and/or of soft-keys or other widgets (e.g., scrolling and highlighting features in a graphical user interface (GUI)) in a touch screen of a display monitor as part of rendering component 108. The user selects a multimedia function (e.g., play out video, play out audio) and selects via UI 110 the relevant file of the content information to be rendered in rendering component 108.

UI 110 is controlled through host processor 102. Upon user selection of a media function, e.g., the rendering of audio, through UI 110, host processor 102 initiates the powering up of co-processor 104. The powering up includes, e.g., initializing the power supply system (not shown) of co-processor 104, e.g., low dropout regulators (LDOs), and DC-to-DC converters, and generating a power-on reset to co-processor 104 and, possibly to rendering component 108 and other peripherals (not shown). Before and during the start-up of the rendering of the media by co-processor 104, host processor 102 is fully awake. After initiating the rendering at co-processor 104, host processor 102 enters a sleep mode. That is, host processor 102 awakes co-processor 104 because host processor 102 needs the services of co-processor 104 as invoked by a user request via UI 110. Host processor 102 goes into sleep mode after co-processor 104 is properly configured and provided with the data co-processor 104 needs for the requested service.

In the sleep mode, host processor 102 consumes only a small amount of power when acting as the base-band engine during a time period wherein the cellular front-end is updating with the communication network for any incoming call. Most of the circuitry of host processor 102 is switched off and only little circuitry is powered for sensing a trigger.

After co-processor 104 has powered up, co-processor 104 signals a boot request to host processor 102 via a host interface controller 116.

The co-processor-specific firmware and settings, needed for booting co-processor 104, are stored in fixed non-volatile memory linked to host processor 102. The firmware and settings are basically part of the regular firmware of the mobile communications device 100, implemented as, e.g., a mobile telephone. Host processor 102 determines from the boot request what program image corresponds to the newly attached co-processor. Host processor 102 then fetches this image from the persistent storage and conveys it, via host interface controller 116 and co-processor interface controller 114, to a dedicated memory space of memory 118 in co-processor 104. After this, co-processor 104 starts execution from this memory space and exposes the service requested.

Preferably, the firmware is transferred in binary format, with a header and checksum so as to enable media co-processor 104 to detect errors in the data and thus to preserve integrity of the data upon loading the firmware into an internal memory 118, e.g., an SDRAM. Upon verifying the integrity of the firmware via the checksum on the header and payload, media co-processor 104 starts executing.

Accordingly, the firmware is loaded into memory 118 when device 100 (e.g., a mobile telephone) is switched on or when an additional function or modified function of co-processor 104 is needed. Therefore, device 100 enables to dynamically load software components into memory 118. As a result, the size of embedded memory 118 can be kept relatively small. In addition, flexibility is introduced into the services provided by co-processor 104.

As mentioned above, the user selects via UI 110 the content information to be played out. Host-processor 102 first retrieves the content information from a media container 120 onboard device 100, or from an external storage, e.g., accessible via a data network and locally buffered in a buffer 120. The content information is retrieved as a data file, including metadata indicative of the type (e.g., audio, video) and format (e.g., MP3, MPEG 2, etc.) of the content information. This metadata enables host processor 102 to select the proper codec. Host processor 102 configures the multimedia streaming framework of co-processor 104 via the co-processor application interface that enables interaction between host processor 102 and co-processor 104. After this has been carried out, co-processor 104 requests a first segment of the selected content information, and buffers the segment into local volatile storage 132. The size of the segment transferred is matched to the size of buffer 132. After enough data has been received, co-processor 104 begins the play-out via a media decompression unit 128 and rendering component 108. Host processor 102 enters the sleep mode, provided that no other tasks are required from other services or applications. The transfer mechanism will be discussed in more detail further below.

In an embodiment of device 100, data communication between host processor 102 and co-processor 104 is enabled by using a specific multimedia framework (or: software interface), e.g., the OpenMax API developed by Khronos Group. OpenMax is an industry attempt to define a clear media interface description for media components. The description specifies, among other things, the media streaming framework. It supports abstracting the functions of co-processor 104 to media services agreed on industry-wide.

During play-out, co-processor 104 signals to host processor 102 that it is ready to receive a next segment of the content information, by issuing a wake-up signal to interrupt handler 112. Upon receipt of the wake-up signal from co-processor 104, interrupt handler 112 causes host processor 102 to switch from the sleep mode to the active mode. In the active mode, host processor 102 retrieves a next segment of the selected content information, transfers it to co-processor 104 via host interface controller 112 and co-processor interface controller 114, and enters the sleep-mode again.

As mentioned above, in an embodiment of the invention, the segment of the selected content information is retrieved from media container 120 onboard of, or electrically connected to, device 100, under control of a storage interface controller 122 and a load-store unit 124. As known, a load-store unit is a dedicated module for handling simple interactions with a memory, in this case media container 120. Media container 120 comprises, e.g., a flash-card. Preferably, the segment, as supplied by host processor 102, is in compressed format so as to maximize the ratio of the rendered bit rate to the bit rate of the compressed data. Also, the compressed format further enables to shorten the time period for transfer and, therefore, the time period during which host processor 102 stays in the active mode. Co-processor 104 then comprises decompression module 128 for carrying out the decompression operations. Note that decompressing the media at co-processor 104 reduces the average data-rate from host processor 102 to co-processor 104 compared to the rendered output. This feature of having the decompression carried out at co-processor 104 contributes significantly to having host processor 102 asleep as long as possible. Other factors contributing are the buffer size of storage 132 and the maximum transfer rate between host processor 102 and co-processor 104. Therefore, the segment is sent from via a high-speed data bus 126 so as to keep the active time of host processor 102 as brief as possible. For example, high-speed data bus 126 is a Serial Peripheral Interface (SPI), a Mobile Industry Processor Interface (MIPI), a high-speed serial interface (HSI), a Mobile Industry Processor Interface (MIPI) slim bus (a serial low-power inter-chip media bus), a MIPI Unipro (Unified Protocol, a layered protocol on a high-speed serial interface for interconnecting devices and components within mobile systems such as mobile telephones, handheld computers or PDAs, digital cameras, etc., and designed for high data rates, high efficiency and low pin count), etc. On a serial bus of above kind, typical data speeds lie in the range of 1 Mbits/sec to 100 Mbits/sec. Alternatively, host-processor 102 retrieves, e.g., downloads, the content information from an external source via a wireless connection, e.g., through an access point from a server on the Internet or another data network, under control of baseband module 106. The retrieved data of the selected content information is buffered in a network buffer 130. Network buffer 130 then serves a role similar to that of storage 120 discussed above. Note that it is an option to download the content information completely into network buffer 130. Another option is to download the content information in segments, so as to buffer a single segment in network buffer 130 one at a time. Preferably, the server side provides the content information in segments one after the other. Upon a download of a segment, host 102 can enter sleep mode until the next segment is due for delivery to media co-processor 104. Within this context, reference is made to EP patent 1 131 930, entitled "PARTITIONING OF FILE FOR EMULATING STREAMING". This patent relates to partitioning an electronic file, e.g., an MP3 file, into a sequence of segments at the server side. The first segment is played out upon downloading. While the first segment is being played out, the second is being downloaded and buffered so that it is available when the play out of the first segment has completed. While playing out a current one of the segments, next one(s) of the segments are being downloaded and buffered. This partitioning and sequential playing out enables to emulate streaming of a file and to minimize latency while downloading an electronic file.

After having received from host processor 102 a segment of the content information, co-processor 104 buffers the segment in a local volatile storage 132. The data of segment buffered in storage 132 is then read out in media decompression unit 128 and subsequently transferred to media rendering controller 134 that converts the data into a format suitable for rendering in component 108. For example, if the content information is an audio file, controller 134 converts the digital format into an analog format for driving a loudspeaker in component 108. As another example, if the content information is a video file, controller 134 converts the data of the video file into a proper digital format for being rendered on, e.g., an LCD display monitor in rendering component 108. Storage 132 preferably comprises a DRAM or an SDRAM configured as a circular buffer (or: ring buffer).

In order to continue the rendering in a seamless manner, a new segment is to be transferred to co-processor 104 before the currently rendered segment has finished. Accordingly, host processor 102 is to be awakened on time and is to be switched from the sleep mode to the active mode for retrieval of the next segment and for transferring the next segment to co-processor 104 via bus 126. Upon the transferring, host processor 102 goes into sleep mode again. Co-processor 104 is to issue the wake-up signal before the rendering of the current segment has completed, taking into account the time needed for host processor 102 to enter the active mode upon receipt of the wake-up signal, and the time to retrieve and transfer the next segment.

One way of implementing a mechanism for this timely awakening is to determine in advance the time needed for co-processor 104 to render the current segment, the time needed by host processor 102 to wake up, retrieve the next segment and have it transferred to co-processor 104, and the time needed for co-processor 104 to process the segment before it is ready for being rendered. A clock is re-started at the play out of each new segment. After a re-start and while the current segment is being rendered, the clock indicates at any moment the amount of time that is left before the rendering of the current segment has completed. If the time left is equal to, or somewhat larger than, the length of the time period needed for host-processor 102 to wake up, retrieve the next segment and transfer it to co-processor 104, plus the length of the time period needed by co-processor 104 to process the next segment before it is ready for being rendered, then co-processor 104 is to issue the next wake-up signal to host-processor 102.

Another way of implementing this is to have co-processor 104 keep track of the amount of data left in buffer 132 for being rendered. A threshold or watermark can be set at the amount of data left in buffer 132, whose rendering will require time enough for, in the meantime, host-processor 102 to wake up, retrieve the next segment and transfer it to co-processor 104, and co-processor 104 to process the next segment before it is ready for being rendered. The threshold or watermark depends on, e.g., the size of buffer 132, the size of the segments of content information, the transfer speed at bus 126, and the times referred to above for having co-processor 104 receiving the next segment from host processor 102 and preparing it for rendering.

In short, since the rendering process is linear in time, the content information can be divided into temporally consecutive segments, and the rendering of consecutive ones of the segments can be concatenated. The segmentation of the content information enables host processor 102 to operate in a burst to transfer a segment, and to stay in a sleep mode between bursts, thus saving power. In an embodiment of the invention, host processor 102 segments the compressed data on the fly and in dependence on the implemented size of buffer 132.

Now consider the scenario of an incoming telephone call, incoming SMS message, incoming video message etc., being handled by module 106, under the following different conditions: 1) media co-processor 104 is busy rendering content information; and 2) media co-processor 104 is off, or is in an idle/sleep mode waiting for a trigger from host processor 102.

Under condition 1) media co-processor 104 is rendering content information while a message (e.g., a telephone call, an email, an SMS, etc.) is coming in via module 106. Module 106 comprises one or more codecs 136, for example, a voice codec, a text codec, a video codec, etc. Host processor 102 sends the data, representative of the incoming message in analog format or digital format (e.g., via an I2S bus in pulse-code modulation (PCM)) to media co-processor 104. Media co-processor 104 has bypass paths for direct transfer of the message data to rendering module 134. Module 134 has a combiner 138 for functionally combining the data with the content information being rendered at that moment. For example, the incoming message is a telephone call and the content information being rendered is an audio file. Then, the ring-tone is mixed with the audio being rendered and the mixed data is sent to rendering component 108, here a loudspeaker. If the user decides to accept the call, the voice data is mixed with the audio being rendered and the mixed data is sent to loudspeaker 108. In a configuration mode, device 100 can be configured by the user to mix the content information data and the voice data according to different settings with regard to sound volume. That is, the user can configure device 100 via UI 110 to turn down the volume of the audio content information to a desirable level, as soon as the ring-tone is mixed in and rendered. Configuring sound levels on a media player is known in the art and not discussed here in further detail. In another example, the incoming message is an SMS message, and the content information being rendered is a video clip. Module 106 then submits to media co-processor 104 text data (or other data for being rendered visually) to alert the user to the newly received message. This text data is then mixed with the video data of the clip. For example, the alerting data is superimposed on the images of the video clip, preferably in a not too intrusive manner, e.g., via a semi-transparent icon. The data for re-creating the icon is stored, e.g., in storage 120. If the user then decides to view the SMS message, its text is sent as data from module 106 to module 134 and is rendered similarly via combiner 138 in an overlay. Both the alert to the message and the message itself are rendered using, e.g., an on-screen display (OSD) technology.

Under condition 2) media co-processor 104 is turned off or is idling or in sleep mode when module 106 receives an incoming message. Via general purpose inputs/outputs (GPIO) of processors 102 and 104, and the bypass paths, host processor 102 externally enables/disables rendering component 108. The bypass paths enable co-processor 104 to stay in a sleep mode, wherein only the circuitry from combiner 138 to rendering component 108 is still active, albeit at low power. High-speed bus 126 is not needed under these circumstances. Note that this is beneficial for reducing the power consumption, as high-speed bus 126 needs support from both host processor 102 and co-processor 104.

Note that in typical mobile telephone software, voice is handled in the modem stack. The modem software stack is running on host processor 102. The modem stack typically relates to handling voice communications and other events arriving via the telecommunications network. For example, an SMS arrives via the modem. The event is signaled via the modem stack (e.g., to generate a ring-tone), but the processing, editing etc., goes via the application stack, also running on host processor 102. Accordingly, SMS and other telecommunications services (e.g., emails, videoconferencing, etc.) are taken care of by host processor 102. However, host processor 102 needs access to rendering component 108 via co-processor 104. Co-processor 104 has been optimized for this function and provides the bypass paths as mentioned above. Accordingly, only a connection to rendering component 108 is needed.

For its operating in sleep mode, co-processor 104 has been configured in a low-power mode. This could include processor 104 operating in a halt mode or an idle mode. Further, SDRAM 118 could be put into a self-refresh mode in order to further reduce power consumption. Via dedicated GPIOs, host processor 102 can enable and disable paths to and from rendering component 108. Asserting such a GPIO will wake-up co-processor 104 (e.g., via an interrupt). Co-processor 104 in turn will power-up rendering component 104 and return itself back to sleep mode, and consequently put SDRAM 118 back to the self-refresh mode as well. As the paths are now enabled, host processor 102 can access rendering component 108. After host processor 102 has finished its task, host processor 102 can disable the paths to rendering component 108. Power consumption could further be reduced by loading a specially prepared program, not requiring storage into SDRAM 118. Hence SDRAM 118 could be fully powered down. Such a small program could fit into an on-chip SRAM (not shown) at co-processor 104 and consume very little power in sleep mode (only retention is needed).

Now consider the scenario wherein media co-processor 104 is rendering a first piece of content information and the user selects via UI 110 a second piece of content information for being rendered while the rendering of the first piece is in progress. Upon receipt of the user input, host processor 102 acts via the OpenMax software layer, and stops the play-out of the first piece. Host processor 102 retrieves the first segment of the second piece from media container 120 (or from an external source via network buffer 130), and forwards the first segment to media co-processor 104 using the process described above. Buffer 132 is then reloaded and the play-out re-starts. If a new codec or effect is selected, a new graph is built and different components are activated and loaded. The architecture of device 100 supports dynamic loading of components. Accordingly, even after booting and set-up, new components can be loaded and existing components (codecs, effects) can be removed from buffer 132 and SDRAM 118.

For example, consider the scenario wherein the play-out of a first song is followed by the play-out of a second song, e.g., pre-determined via a play-list or selected by the user upon the completion of the play-out of the first song. The second song might have a different audio codec. Therefore, the audio path needs to be reconfigured at runtime. This reconfiguring is under control of the OpenMax software, mentioned above. The OpenMax is a common approach, industry-wide, to invoking media-related services. It support dynamic loading of components. This feature supports the flexibility of using co-processor 104 in any platform. Similarly, it can also deal with upgrades on media container formats.

In an embodiment of the invention, the last segment of the first song has a special marker added in order to signal the end-of-stream of the song previously selected for playback. Host processor 102 has the option to start-up a second stream before the current one has finished, via the instantiation of a second decoder, so as to enable, e.g., a seamless playback from the current song to the next song. This enhances the user experience and avoids that the next song will only start after the new graph has been configured and the new segment has been loaded in buffer 132.

Similarly, sound volume and/or image brightness etc., can be changed via UI 110 and via the OpenMax software that instructs media co-processor to change the setting.

Co-processor 104 comprises a microcontroller 140 that processes data under software control. In an embodiment of device 10, microcontroller comprises circuitry separate from, e.g., host-interface controller 116, media decompression unit 128 and/or media rendering module 134. In another embodiment, host controller 116, media decompression unit 128 and media rendering module 134 are functionalities implemented by microcontroller 140 under software control. For clarity, functionalities 116, 128 and 134 are shown in FIG. 1 as entities separate from microcontroller 140.

For high-volume portable multimedia products, e.g., mobile phones and music players, system design focuses on power consumption and silicon area. As to the power performance of embedded microcontroller 140, the static memory (ISRAM) 142, very near to microcontroller 140, is lower-power and is faster than local volatile storage 132 when implemented as SDRAM or DDRAM (DDR SDRAM or: Double Data Rate-Synchronous DRAM). However, ISRAM size has a large impact on the die area and therefore on the selling price of the product. ISRAM is used by software for storing both code that is executed on the embedded processor and for storing data. In known processors, e.g., the Nexperia PNX0103 Mobile Multimedia processor, the software solution divides a logical memory space used for instruction code and read-only data in chunks (pages) of equal size. A page is loaded into the internal memory from external storage (e.g., NAND flash memory) upon first access to any data contained in the page. Since the amount of ISRAM is limited, the solution contains a mechanism to determine which pages to remove from the ISRAM. This solution and its extensions are referred to herein as "On-Demand-Paging" (ODP). In the invention, an ODP mechanism is used to load instruction code from SDRAM into SDRAM in order to reduce power consumption. As such the local RAM can be seen as a small cache. It will reduce power compared to a situation that all code needs to be fetched from an off-chip DRAM.

As known, the expression "Demand Paging" is used in the field of computer operating systems and refers to an application of virtual memory.

The infrastructure used by the embedded processor to enable this is the Memory Management Unit (MMU) and the data and instruction abort-handlers. The MMU provides the logical-to-physical mapping of the embedded processor's memory space. For ARM systems the MMU uses a section table for mapping 1 MB address ranges, and page tables to allow a finer-grained logical-to-physical address mapping. The finest grained mapping is on 4 kB or 1 kB pages. These will also be the granularities of the ODP pages. The table entries in the MMU also contain a control to allow or prevent access to part of the logical memory space. This way, the ODP algorithm will mark pages as "Active" (i.e., access is allowed) or "Deprecated" (i.e., access is denied or page is inactive). When code or data from a Deprecated page is fetched by the embedded processor (referencing), the embedded processor will raise an exception interrupt, e.g., a "Prefetch" or a "Data Abort" for ARM systems.

The number of page loads influences system performance, as cycles spend on loading cannot be used for anything else. The number of page loads also affects power consumption because accessing the storage device and DRAM consumes power.

Most On-Demand-Paging algorithm has the drawback that the number of page loads is not limited.

In an embodiment of the invention, a mechanism is used to limit the number of page loads and therefore also the power consumption. The mechanism optimizes the power consumption spent on memory accesses for code execution.

Relevant aspects of the mechanism include: a state-machine that decides in runtime which code to execute from ISRAM or from SDRAM; a state machine that decides in runtime how to load pages from external storage to execution from ISRAM or from SDRAM and a mechanism to manage the memory space managed by the ODP at runtime.

Figure 2:
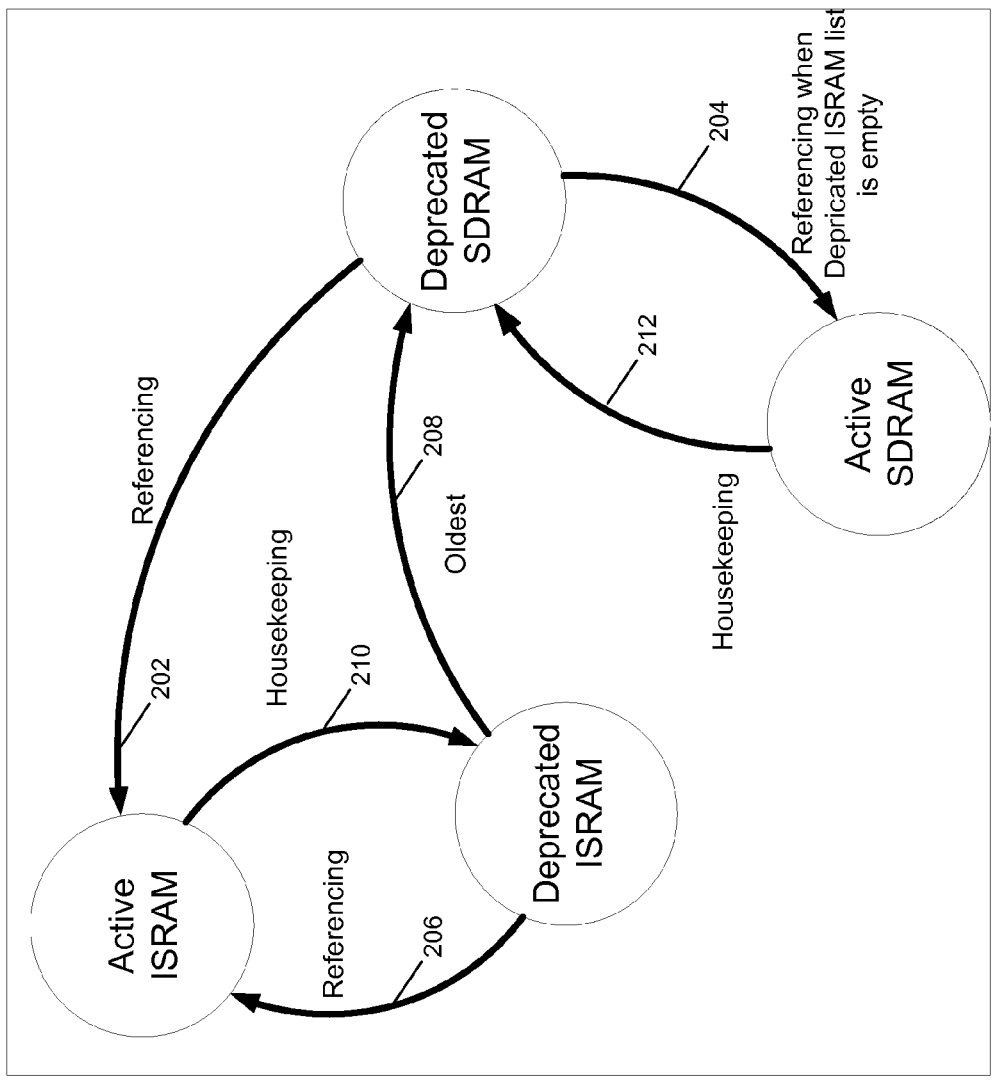
FIG. 2 is a state machine diagram illustrating the transitions in an On-Demand-Paging (ODP) approach used in memory management in the device of FIG. 1.

With reference to state diagram 200 of FIG. 2, each page (1 kB or 4 kB) of the logical ODP memory space can be in one of four states. State "Deprecated SDRAM": the page physically resides in SDRAM but it access through its logical address is denied in the MMU page table entry. State "Deprecated ISRAM": the page physically resides in ISRAM but its access through its logical address is denied in the MMU page table entry. State "Active ISRAM": the page physically resides in ISRAM and its access through its logical address is allowed in the MMU page table entry. State "Active SDRAM": the page physically resides in SDRAM and its access through its logical address is allowed in the MMU page table entry.

The reason for introducing the concept of "Deprecated" states is to introduce a form of history in the system. This way, pages that are often needed will stay in ISRAM and pages that belong to sporadic events will remain in SDRAM. Periodically, a housekeeping (HK) task will move a number of "Active" pages to the "Deprecated" state. The method maintains for each state an ordered list of all pages having that state, so that the HK can pick the oldest pages for state transitions.

Diagram 200 illustrates the following possible transitions:

Transition 202: Deprecated SDRAM-Active ISRAM: a page is referenced and there are pages that are in the Deprecated ISRAM state. The page is copied to the ISRAM and the page table is setup to reflect the mapping. The oldest Deprecated ISRAM page will transition to the Deprecated SDRAM state since its content is overwritten by the page that makes the transition to Active SDRAM. See transition 208 below.

Transition 204: Deprecated SDRAM-Active SDRAM: a page is referenced and there are NO pages that are in the Deprecated ISRAM state. The page table is setup to activate the mapping.

Transition 206: Deprecated ISRAM-Active ISRAM: the page is referenced and the page table is setup to activate the mapping.

Transition 208: Deprecated ISRAM-Deprecated SDRAM: this transition is the counterpart of transition 202 above. The page does not need to be copied to SDRAM since its original memory was never freed. The MMU page tables need to reflect the changed physical mapping.

Transition 210: Active ISRAM-Deprecated ISRAM: Periodically, a "housekeeping task" will move a number of X Active pages to the Deprecated ISRAM state. For these pages the only thing that needs to happen is to set the page to inactive.

Transition 212: Active SDRAM-Deprecated SDRAM: Periodically, a "housekeeping task" will move a number of Y Active pages to the Deprecated SDRAM state. For these pages the only thing that needs to happen is to set the page to inactive.

Since the Deprecated states form the history of accesses in the system, it is relevant to know how to determine the values X and Y. The following scenarios are considered:

1) Set X and Y to a value equal to the number of Active SDRAM pages. Accordingly, after housekeeping, the number of Active SDRAM pages is zero.

2) Set Y to a value equal to the number of Active SDRAM pages. Accordingly, after housekeeping the number of Active SDRAM pages is still zero. However, limit X to the value of the minimum of Z and Y, wherein Z is a constant that limits the number of pages that move from Active ISRAM (or Active SDRAM) to Deprecated ISRAM (or Deprecated SDRAM). Determining Z is all about determining the trade-off between the power (where Z should be as low as possible) and the speed to go from one low power system state to another, which uses different ODP pages (where Z should be as high as possible). A proper value of Z can be obtained by observing the power consumption of the scenario that requires the lowest power over a range of Z values.

3) Set the values of X and Y to the minimum of Z and the number of Active SDRAM pages at the start of the housekeeping (HK). Z can be determined as in scenario 2) above.

4) Any of the above scenarios can be extended such that, if between 2 HK tasks there was no change in the Deprecated ISRAM and SDRAM states, then the number of pages reserved for ODP is reduced. At housekeeping time there are no ISRAM Deprecated pages and SDRAM Active pages. This occurs for system states that need fewer ODP pages than there are reserved. This memory can then be used by another part of the system, e.g., codec work area. Once there are again SDRAM Active pages in the system, these borrowed pages can be reclaimed.

Figure 3:
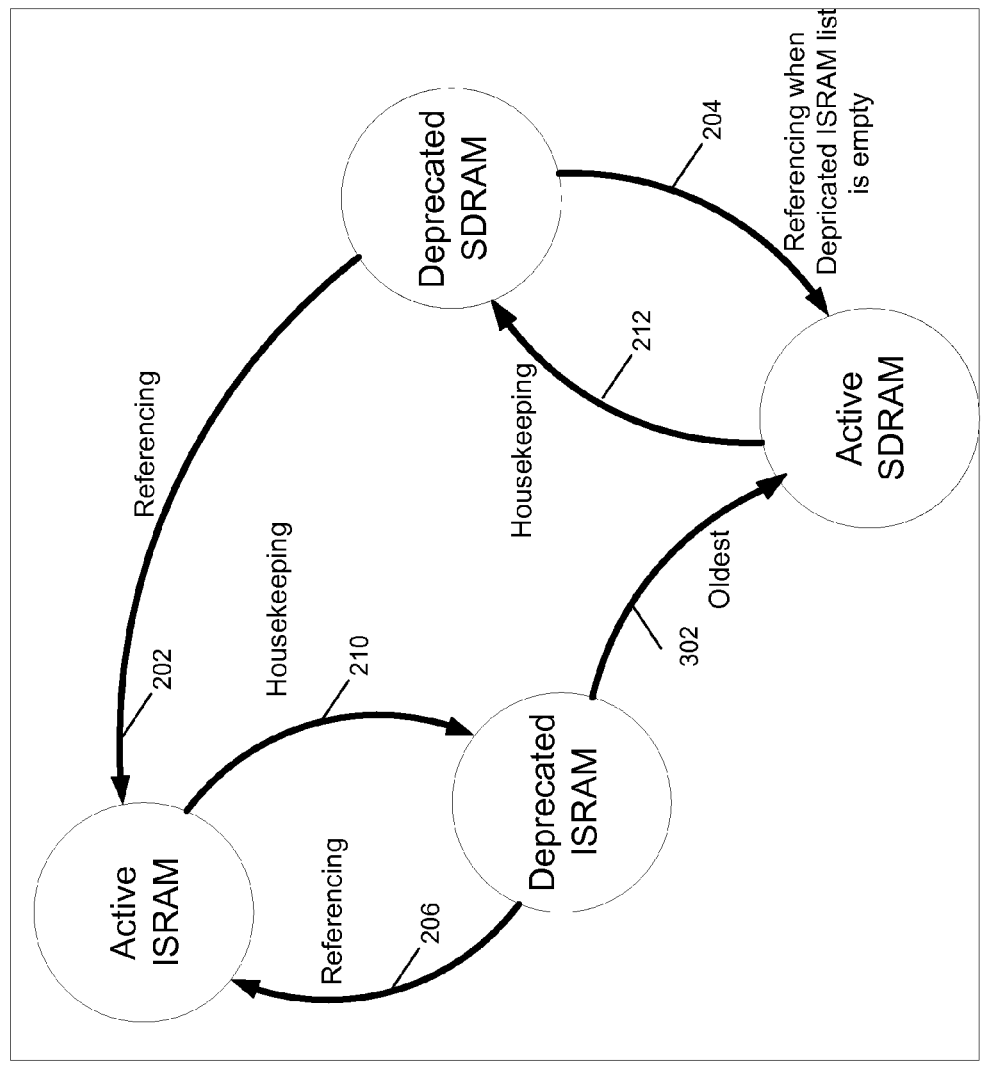
FIGS. 3 and 4 are state machine diagrams giving alternatives to the diagram of FIG. 2.

FIG. 3 is a state diagram 300 illustrating an alternative to the behavior in diagram 200 of FIG. 2. Instead of transition 208 from Deprecated ISRAM to Deprecated SDRAM in diagram 200 of FIG. 2, diagram 300 illustrates a transition 302 from Deprecated ISRAM to Active SDRAM. The approach of diagram 300 has more information about the history (more history retention) and can prove more robust than the approach of FIG. 2 against sporadic events and the page loads caused as a result thereof.

Figure 4:
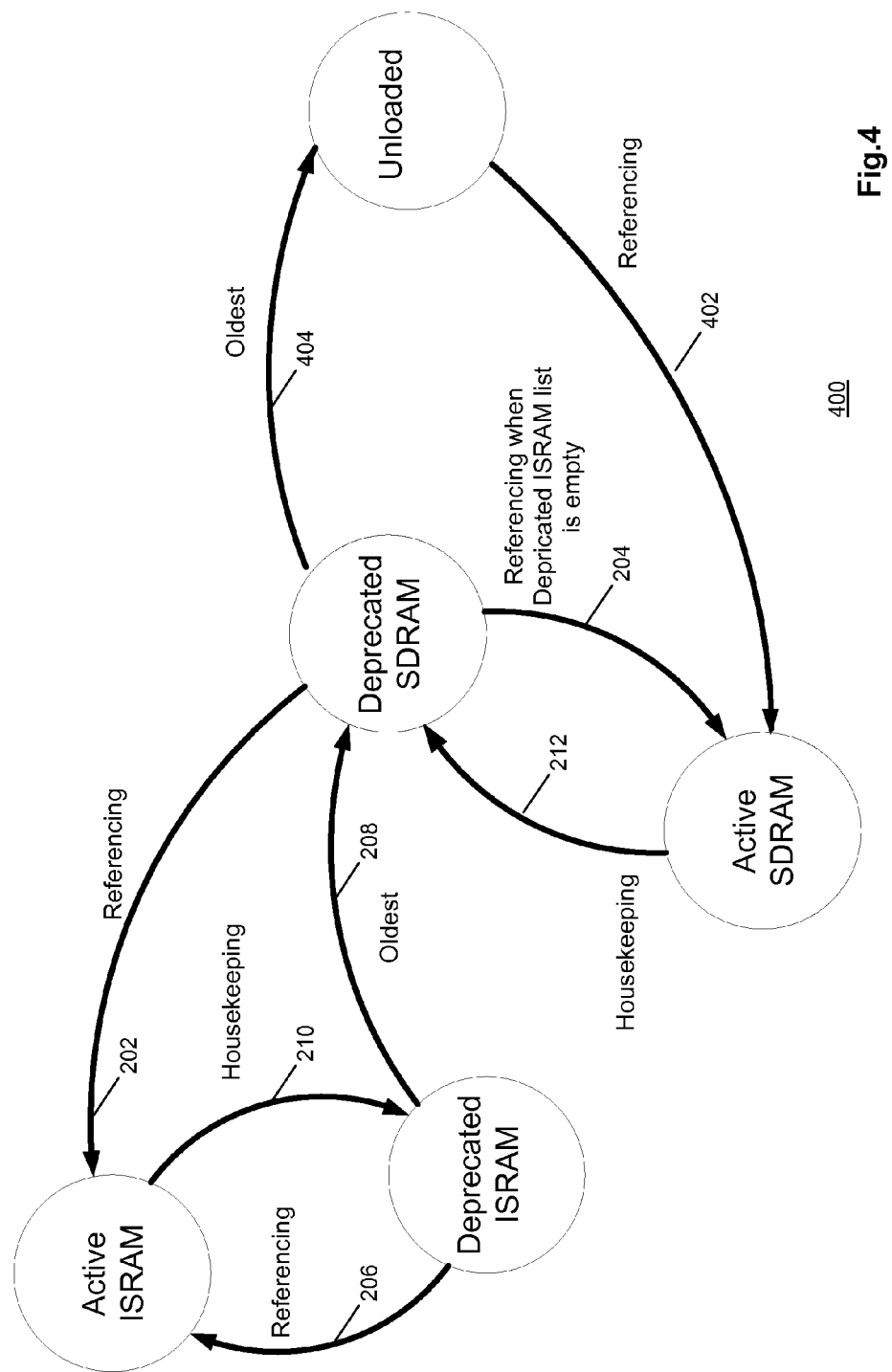

FIG. 4 is a state diagram 400 illustrating another alternative to the behavior in diagram 200. An extra state "Unloaded" is taken into account. The state "Unloaded" is the state wherein the pages reside in non-volatile non-linear addressable memory, e.g., NAND flash. When "Unloaded" pages are referenced, indicated by arrow 402, they go from Unloaded to Active SDRAM. In case the memory in SDRAM is full, the oldest page from the Deprecated SDRAM list needs to move to the "Unloaded" state transition 404.

It will be appreciated by those skilled in the art having the benefit of this disclosure that this mobile phone with low-power media rendering sub-system provides a rendering functionality for rendering media stored in storage and a user interface for user control wherein a host processor controls the communication functionality and the user interface. And, the co-processor controls the rendering of various types of media. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

The invention claimed is:

1. A mobile electronic device with a communication functionality for communicating via an external communication network, a rendering functionality for rendering content information stored in a storage, and a user interface for user control of the device, the device comprising:
   a host processor for control of the communication functionality and of the user interface; and
   a co-processor for control of the rendering functionality; wherein:
   the host processor has access to the storage;
   the host processor has an active mode and a sleep mode;
   the host processor has high power consumption in the active mode and low power consumption in the sleep mode;
   the co-processor is configured to conditionally supply wake-up signals to the host processor;
   the host processor is configured for, upon receipt of a particular one of the wake-up signals, switching from the sleep mode into the active mode;
   the host processor is configured for, in the active mode, transferring a particular one of multiple segments of the content information to the co-processor before switching back to the sleep mode;
   the co-processor is configured for buffering the particular segment in a buffer before rendering the particular segment;
   the co-processor is configured for, upon detecting a predetermined level regarding a progress of the rendering of the particular segment, supplying a next one of the wake-up signals to the host processor for initiating transfer of a next one of the multiple segments from the storage to the co-processor under control of the host processor; and
   wherein the co-processor further comprises a combiner for combining in a rendering component the rendering of the content information with rendering of a communication received via the external communication network.

2. The device of claim 1, configured for enabling or disabling the rendering component under control of the host processor for control of rendering of the communication when the co-processor is inactive.

3. A method of rendering content information stored in a storage of a mobile electronic device that is provided with a communication functionality for communicating via an external communication network, a rendering functionality for rendering content information stored in the storage and a user interface for user control of the device, further comprising a host processor for control of the communication functionality and of the user interface, and a co-processor for control of the rendering functionality, which method comprises:
   switching the host processor from a sleep mode into an active mode upon receipt of a first wake-up signal, wherein the first wake-up signal is received through the user interface or through the communication functionality, wherein the co-processor is provided with a separate wake-up functionality, through which the host processor can wake up the co-processor into an active mode, and wherein the host processor supplies an instruction to enable and/or disable the rendering functionality through the separate wake-up functionality;
   transferring a particular one of multiple segments of the content information by the host processor from the storage to the co-processor;
   switching the host processor back into the sleep mode;
   buffering the particular segment of the content information in a buffer of the co-processor and thereafter rendering the particular segment; and
   upon detecting a predetermined level regarding progress of the rendering of the particular segment, supplying a next one of the wake-up signals from the co-processor to the host processor for initiating transfer of a next one of the multiple segments from the storage to the co-processor under control of the host processor.

4. The method as claimed in claim 3, wherein the wake-up signal is transmitted by the co-processor.

5. The method as claimed in claim 4, wherein after said first wake-up signal the host processor initiates the co-processor to start rendering.

6. The method as claimed in claim 5, wherein said initiation of the co-processor comprises a step of transferring operation instructions to the co-processor.

7. The device of claim 3, wherein the co-processor for control of rendering functionality comprises:
   means for conditionally supplying wake-up signals to a host processor in the mobile electronic device;
   means for receiving at least one segment of content information from the host processor;
   a buffer for buffering the particular segment;
   processing means for rendering the segment; and
   detecting means for detecting a predetermined level regarding a progress of the rendering of the particular segment so as to enable supply of a next wake-up signal to the host processor.

* * * * *